US008668259B2

(12) United States Patent  
Ulrich

(10) Patent No.: US 8,668,259 B2  
(45) Date of Patent: Mar. 11, 2014

(54) PIVOTING NOSE-LESS BICYCLE SEAT

(75) Inventor: Karl Thatcher Ulrich, Narberth, PA (US)

(73) Assignee: Nexride LLC, Philadelphia, PA (US)

( * ) Notice: Subject to any disclaimer, the term of this patent is extended or adjusted under 35 U.S.C. 154(b) by 0 days.

(21) Appl. No.: 13/350,755

(22) Filed: Jan. 14, 2012

(65) Prior Publication Data

US 2012/0242121 A1      Sep. 27, 2012

Related U.S. Application Data

(60) Provisional application No. 61/433,328, filed on Jan. 17, 2011.

(51) Int. Cl.
*B60N 2/38* (2006.01)
(52) U.S. Cl.
USPC .............. 297/195.1; 297/215.13; 297/215.15
(58) Field of Classification Search
USPC .............................. 297/195.1, 215.13, 215.15
See application file for complete search history.

(56) References Cited

U.S. PATENT DOCUMENTS

| 4,108,462 | A | * | 8/1978 | Martin | 280/304.4 |
|---|---|---|---|---|---|
| 4,176,880 | A | * | 12/1979 | Marchello | 297/452.63 |
| 5,890,691 | A | * | 4/1999 | Payne | 248/289.31 |
| 5,921,625 | A | * | 7/1999 | Muser | 297/215.15 |
| 5,938,278 | A | * | 8/1999 | Langevin | 297/215.16 |
| 6,056,356 | A | * | 5/2000 | Unger, Jr. | 297/201 |
| 6,079,774 | A | * | 6/2000 | Proust | 297/195.1 |
| 6,116,683 | A | * | 9/2000 | Maier | 297/195.1 |
| 6,302,480 | B1 | * | 10/2001 | Hall | 297/201 |
| 6,343,836 | B1 | * | 2/2002 | Yu | 297/195.1 |
| 6,361,108 | B1 | * | 3/2002 | White | 297/195.1 |
| 6,688,684 | B2 | * | 2/2004 | Huang | 297/195.1 |
| 6,705,674 | B1 | * | 3/2004 | McMahan et al. | 297/195.1 |
| 7,044,542 | B2 | * | 5/2006 | Muscat | 297/215.15 |
| 7,249,800 | B2 | * | 7/2007 | Jalkanen | 297/201 |
| 7,494,181 | B2 | * | 2/2009 | Tucker | 297/201 |
| 2002/0185897 | A1 | * | 12/2002 | Crutch | 297/195.1 |
| 2003/0137169 | A1 | * | 7/2003 | Huang | 297/195.1 |

* cited by examiner

*Primary Examiner* — Laurie Cranmer

(57) ABSTRACT

This invention relates to bicycle saddles. Several scientific studies have pointed to the risks of damage to the pudendal nerves and arteries associated with extended bicycle riding with conventional bicycle seats. It is the object of this invention to to provide a bicycle seat that can support the rider's weight while minimizing the pressure on the region near the pudendal canal. A further object of the invention is to allow the rider's legs to pedal without interference with the seat. A further object of the invention is to provide comfortable seating while bicycling. The invention consists of a relatively wide, flat seating surface—with no nose—that supports the sit bones of the rider and that pivots about a vertical axis to allow the seating surface to move out of the way of the rider's legs when pedaling on the down stroke.

2 Claims, 7 Drawing Sheets

Top view of invention illustrating rails, pivot point, and seat motion.

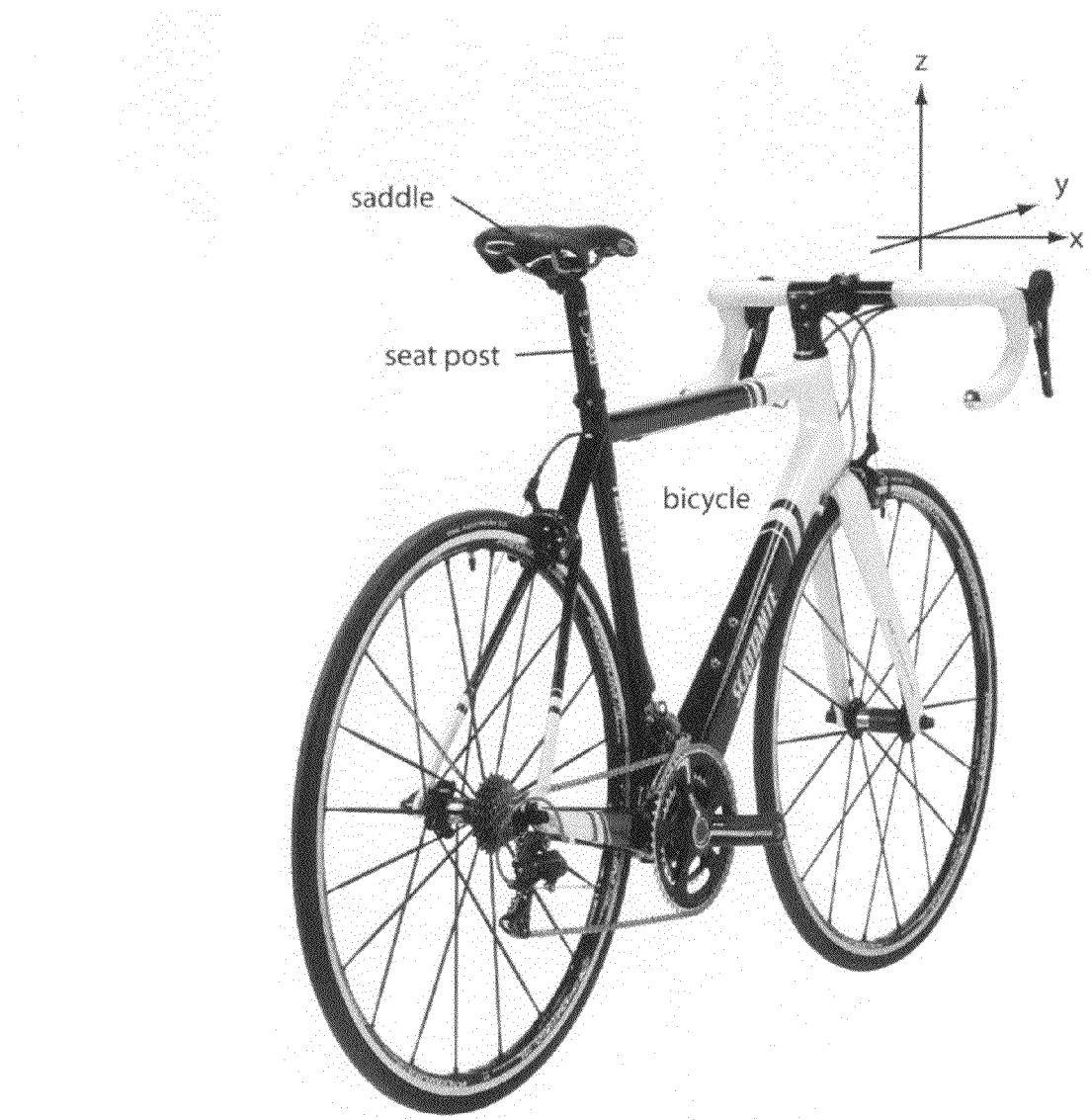
FIGURE 1. Perspective illustration of a bicycle.

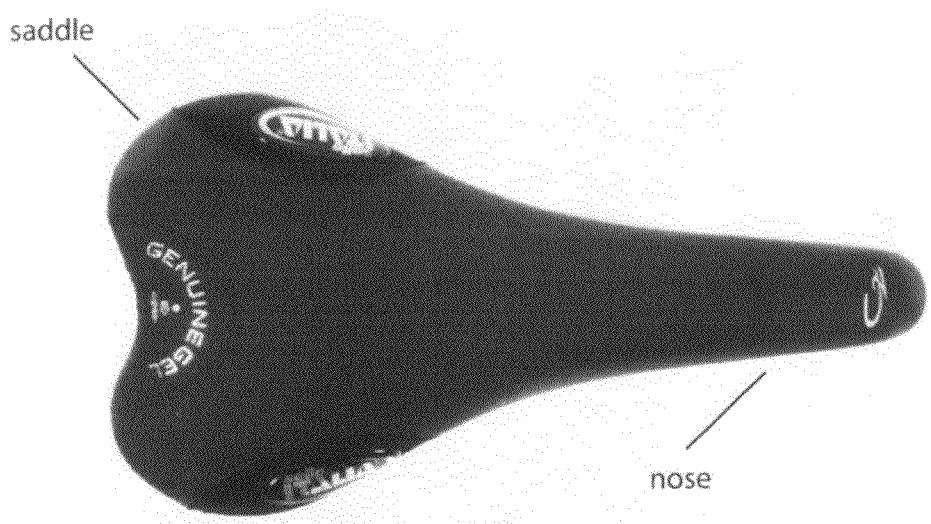
FIGURE 2. Top view of conventional bicycle seat.
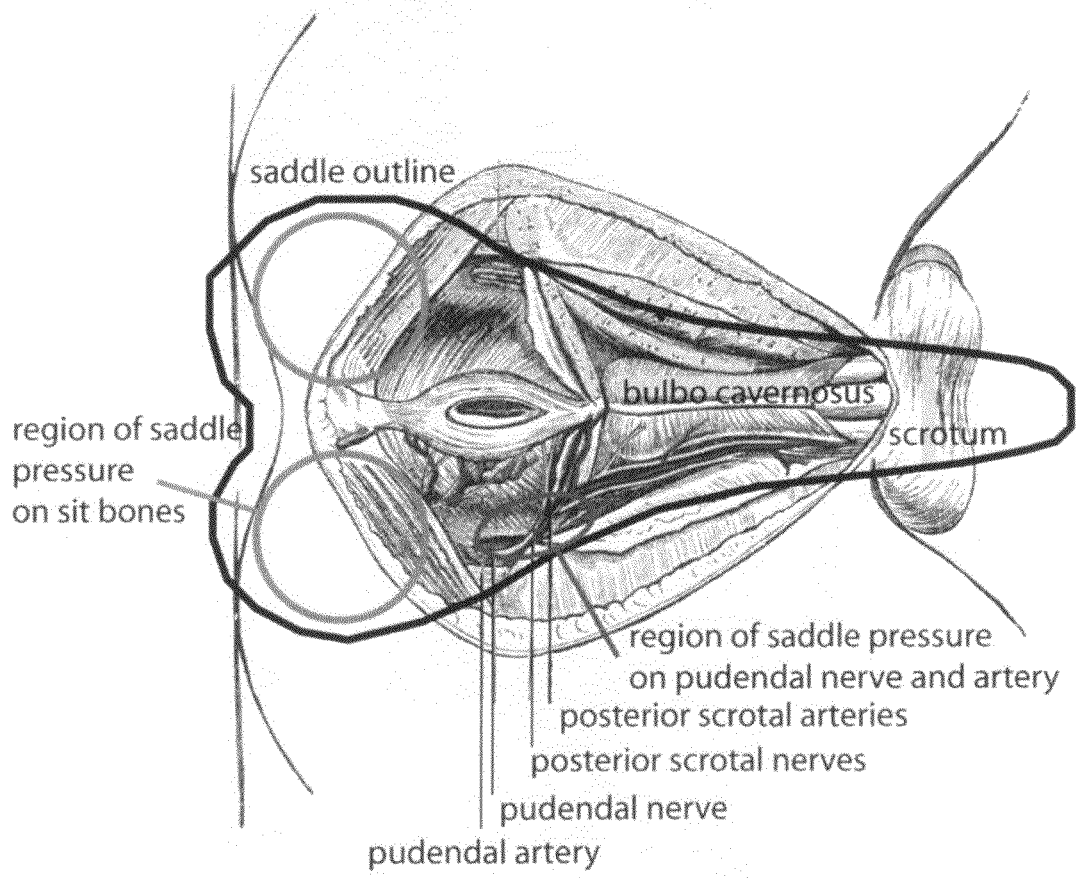
FIGURE 3. Illustration of pelvic anatomy with conventional bicycle seat superimposed.

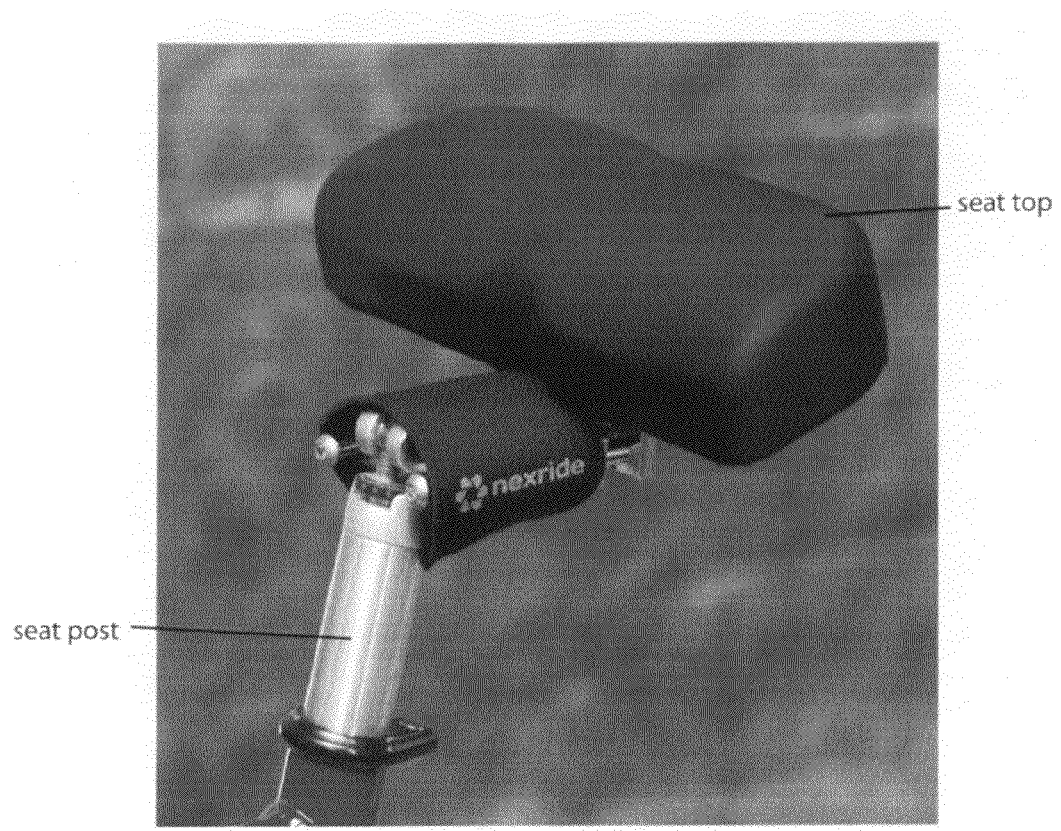
FIGURE 4. Overall perspective view of invention.

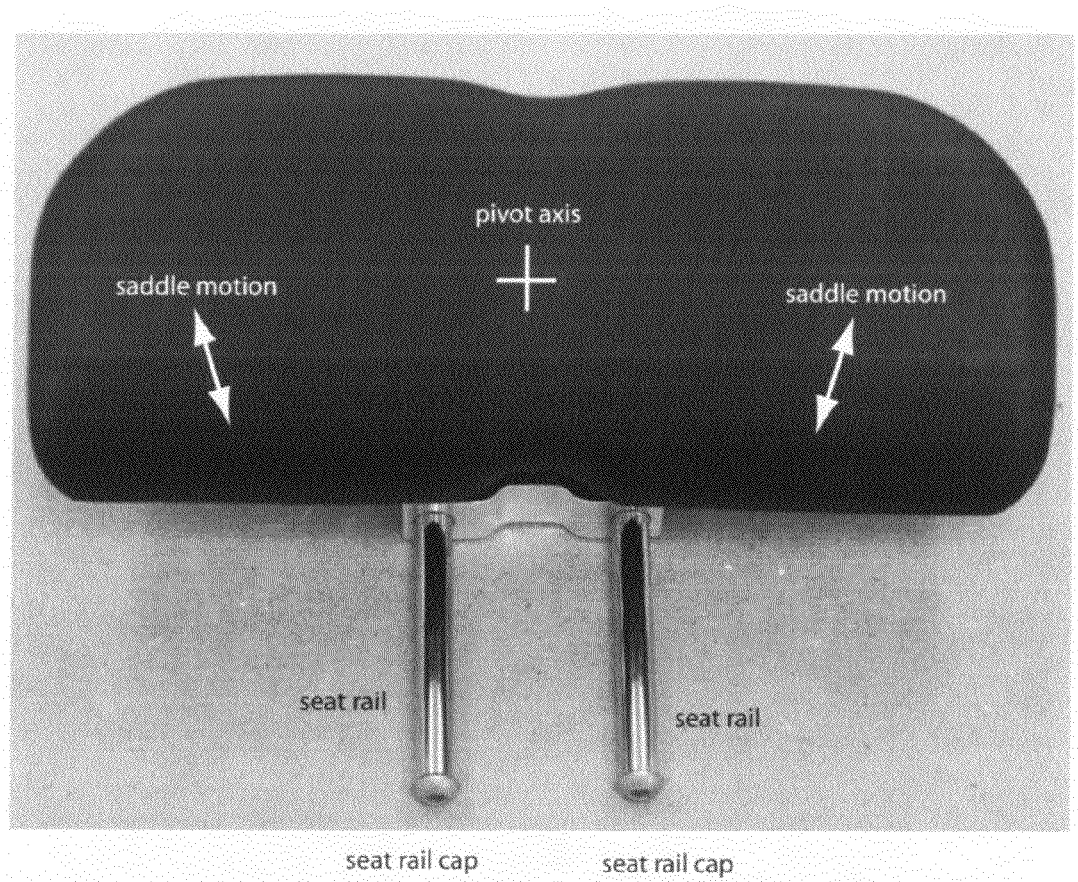
FIGURE 5. Top view of invention illustrating rails, pivot point, and seat motion.
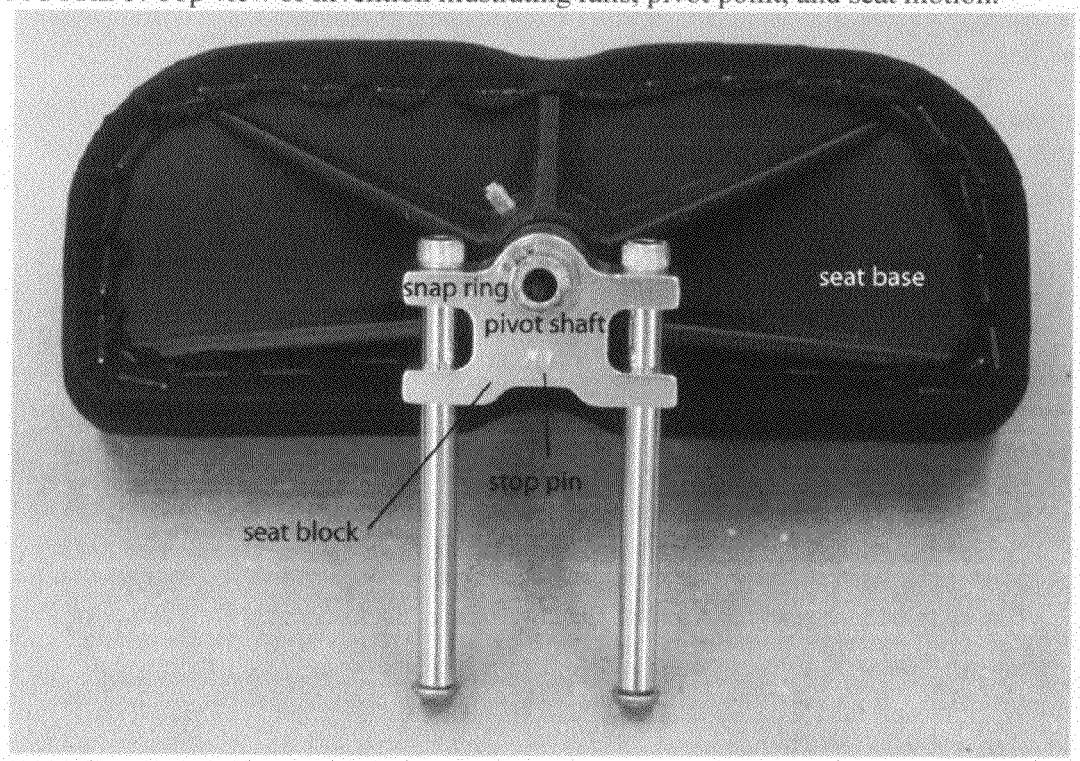
FIGURE 6. Bottom view of invention.

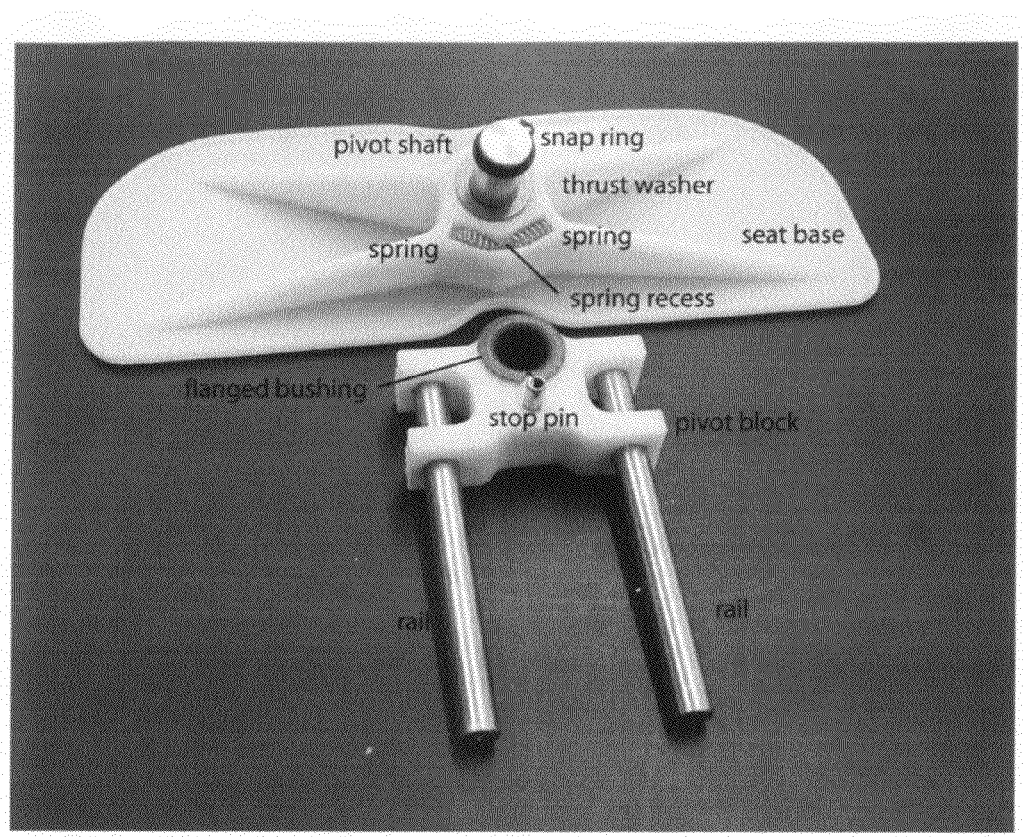
FIGURE 7. View of disassembled components of invention.
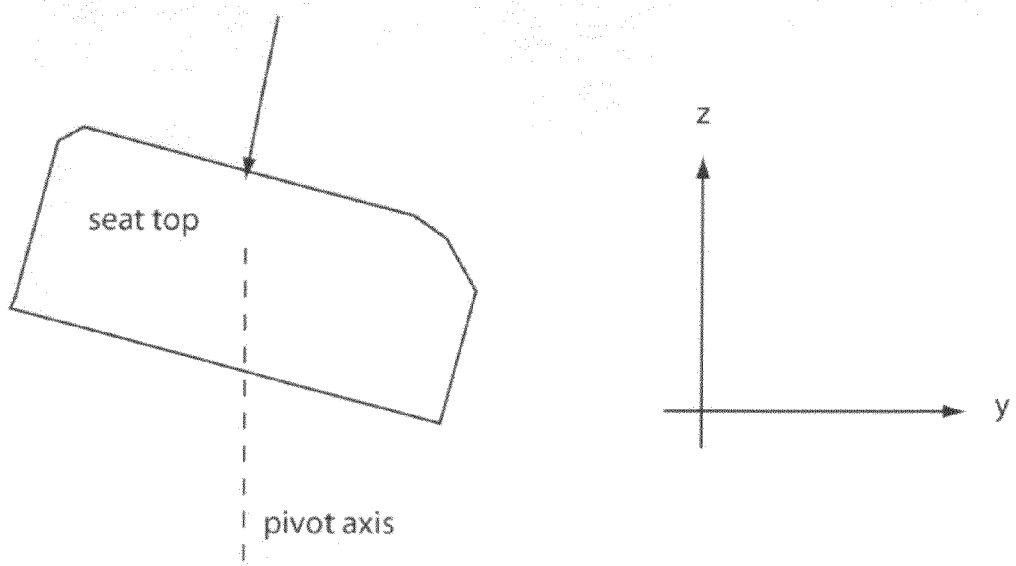
FIGURE 8. Side view of contact geometry of seat and sit bones.

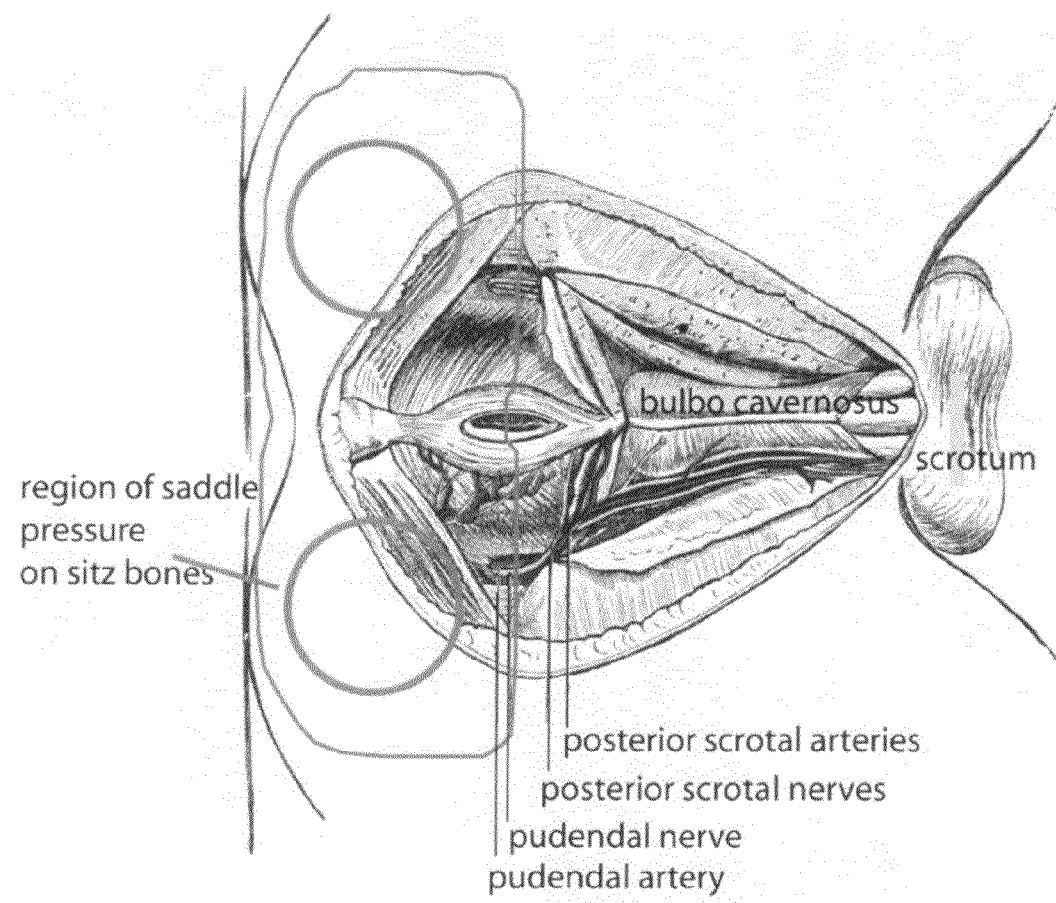
FIGURE 9. Illustration of pelvic anatomy with invention superimposed.

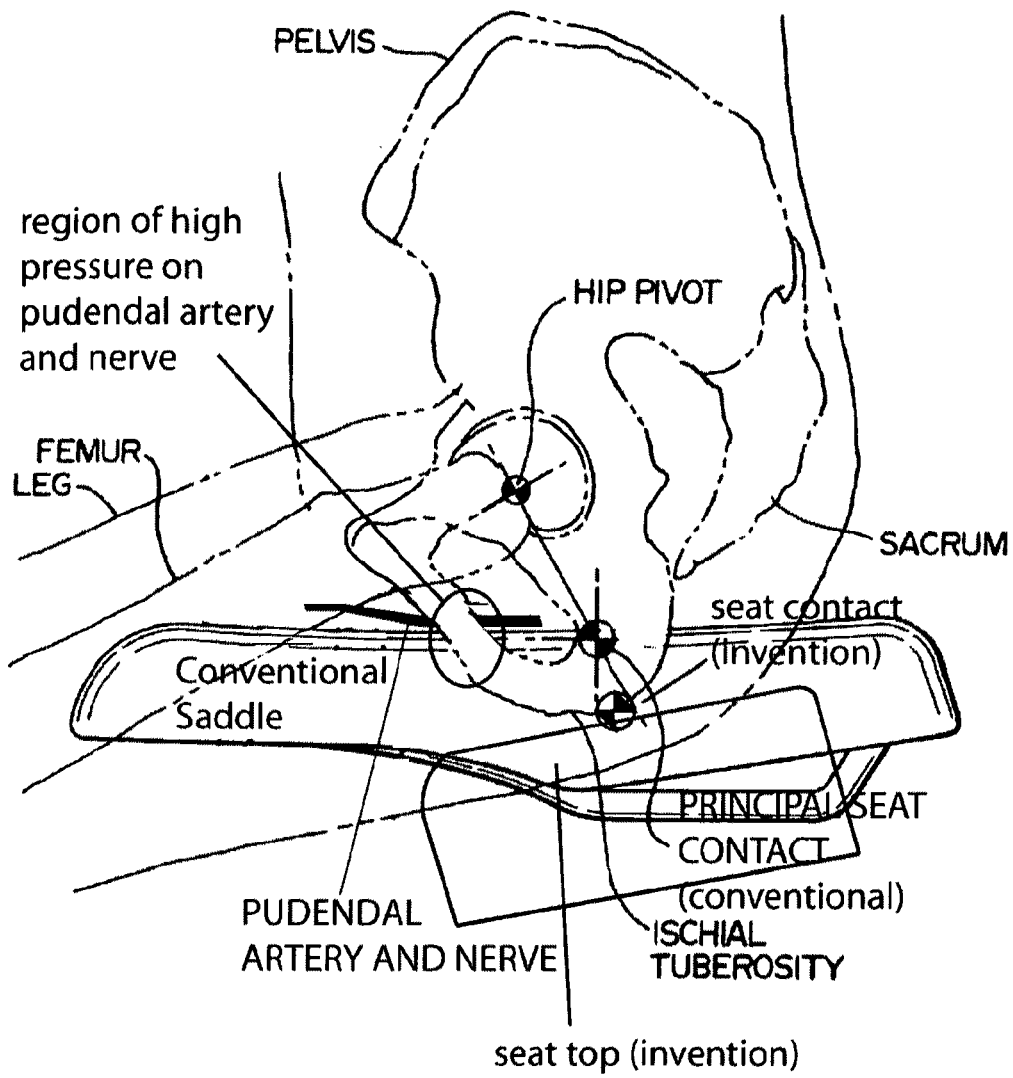
FIGURE 10. Side view of pelvic anatomy illustrating contact points of conventional saddle and invention.

PIVOTING NOSE-LESS BICYCLE SEAT

PRIOR-FILED APPLICATION

This application references Provisional Patent Application 61/433,328 filed Jan. 17, 2011 by Karl T. Ulrich and entitled Pivoting Nose-Less Bicycle Seat, for a benefit claim under 35 U.S.C. 119(e).

BACKGROUND

This invention relates to bicycle seats, also known as bicycle saddles.

Several scientific studies have pointed to the risks associated with extended bicycle riding with conventional bicycle seats. Huang and co-authors survey this literature (2004). Conventional saddles include a protruding element, often called the "nose" that fits between the rider's legs. When the rider's weight is born by the saddle, regions of high pressure are created where the nose of the saddle meets the rider's body. This interface is usually close to the pudendal canal, the anatomical feature that carries a large number of both nerves and blood vessels.

Pressure on the pudendal canal may cause permanent damage to the nerves and blood vessels that supply the pelvic region of the body.

It is the object of this invention to provide a bicycle seat that can support the rider's weight while minimizing the pressure on the region near the pudendal canal. A further object of the invention is to allow the rider's legs to pedal without interference with the seat. A further object of the invention is to provide comfortable seating while bicycling.

SUMMARY

The invention consists of a relatively wide, flat seating surface—with no nose—that supports the sit bones of the rider and that pivots about a vertical axis to allow the seating surface to move out of the way of the rider's legs when pedaling on the down stroke.

BRIEF DESCRIPTION OF THE DRAWINGS

These and other features, aspects, and advantages of the present invention will become better understood with regard to the following description, appended claims, and accompanying drawings, where:

FIG. 1 is a perspective illustration of a bicycle showing a seat post and a seat and illustrating the principal axes used in describing the invention.

FIG. 2 is a top view of conventional bicycle seat.

FIG. 3 is an illustration of human pelvic anatomy with the outline of a conventional bicycle seat superimposed on the illustration.

FIG. 4 is an overall perspective view of an embodiment of the invention.

FIG. 5 is a top view of an embodiment of the invention illustrating rails, pivot point, and seat motion.

FIG. 6 is a bottom view of an embodiment of the invention.

FIG. 7 is a view of disassembled components of an embodiment of the invention.

FIG. 8 is a side view of the contact geometry of the seat and sit bones in an embodiment of the invention.

FIG. 9 is an illustration of human pelvic anatomy with an outline of an embodiment of the invention superimposed.

FIG. 10 is a side view of human pelvic anatomy illustrating contact points between the sit bones and both a conventional saddle and an embodiment of the invention.

DETAILED DESCRIPTION

FIG. 1 shows a conventional road bicycle with conventional seat post and saddle. The bicycle saddle has evolved over more than a century and most commonly is pear shaped with a wider portion of the seat for supporting the pelvis and a narrower portion of the seat, called the nose, located between the legs of the rider.

For the purposes of this description, forward is defined as positive Y, rearward is defined as negative Y. The starboard direction is positive X. The port direction is negative X. The upward direction is positive Z. The downward direction is negative Z.

FIG. 2 is a top view of a conventional saddle showing the pear shape, the wider portion and the nose. The nose extends forward.

FIG. 3 is a bottom view of the human pelvic anatomy adapted from Gray's Anatomy, and with the outline of a conventional bicycle seat superimposed. The bottom of the pelvis consists of two protrusions called the ischial tuberosities or sit bones. The sit bones are the structures that carry most of the load when a human sits on a flat surface such as a bench or chair.

Many nerves and blood vessels extend from the spinal and abdominal area of the body to connect to the legs and sex organs. The nerves and vessels supplying the legs pass through holes in both sides of the pelvis just above the sit bones. The nerves and vessels supplying the sex organs pass through a tube called the pudendal canal, which extends from inside the pelvic region of the body to the sex organs by passing under the pubic arch against the underside of the arch-shaped edge of the bone that extends upward from the sit bones across the front of the body to connect the two sides of the pelvis.

When seated on a conventional bicycle seat, the rider's weight is supported in part by the sit bones, on the rearward, wider portion of the seat, and by the nose wedged against the inside of the pelvic bones as they slope up from the sit bones to form the pubic arch. This wedging of the edges of the nose against the bones of the pelvis causes high pressures near the pudendal canal, thus potentially crushing the pudendal nerves and arteries.

FIG. 4 shows a preferred embodiment of the invention. In this embodiment, a wide bench-like seat top spans the width of the sit bones, such that the rider's weight is entirely supported by the sit bones and surrounding tissues.

In a preferred embodiment, the front edge of the seat top does not contain a substantial nose. In this context, a nose is a protrusion in the positive Y direction, and protrusions are substantial when extending more than 75 mm in the Y direction from the point where the width of the seat top (along the X axis) is greater than 100 mm.

In a preferred embodiment of the invention, the width of the seat top (along the X axis) is approximately 200 mm and the depth along the Y axis is approximately 80 mm. Experimentation shows that widths from about 150 mm to about 250 mm support the sit bones adequately. Depths of 50 mm to 100 mm provide adequate support without interfering with the riders legs.

In a preferred embodiment the seat top is assembled from a soft foam component adhered to a plastic seat base and covered with fabric.

The front edge of the seat top is formed with a radius to minimize the pressure on the back of the rider's leg. While pressure on the back of the leg is unlikely to damage nerves or blood vessels, it can cause discomfort. In a preferred embodiment of the invention, the radius is approximately 15 mm, although a larger radius or a flat bevel is an alternative preferred embodiment.

FIG. 5 shows a preferred embodiment of the invention which includes two rails. These two rails are cantilevered from a pivot block and are spaced 40-50 mm apart to fit a standard two-rail seat-post clamp. The rails are preferably 6-10 mm in diameter. In order to prevent the seat from sliding out the back of the seat post clamp, caps—whose diameter is greater than that of the rails—are attached to the rails. The cantilevered configuration allows the rails to be inserted in many seat-post clamps without substantial loosening or disassembly of the clamp.

Of course, a wide padded bench can be a very comfortable seat. However, such a bench would interfere with pedaling if used on a bicycle. The very properties that make the bench comfortable are those that make it obtrusive to pedaling. A key feature of the invention is that the seat top is pivotally connected to the bicycle, with the pivot axis substantially vertical. The pivoting action allows the seat top to rotate out of the way of the leg of the rider when the rider extends that leg during the down stroke of pedaling. Because both sides of the seat top are connected to each other, the forward rotation of the starboard side of the seat corresponds exactly to the rearward rotation of the port side of the seat, and vice versa. Because the rider's legs are connected to pedals, which are disposed on opposite sides of the bottom bracket of the bicycle, the downward motion of one leg corresponds exactly to the upward motion of the other. Thus, when one leg is down and its corresponding seat half rotated to the rear, the other leg is up with its corresponding seat half rotated to the front. In this way, the rotation of the seat ensures that the seat top never interferes with the gross motion of the rider's legs.

In a preferred embodiment of the invention, deviations from the center position of at least 5 degrees are required to provide sufficient clearance for the downward leg motion.

This combination of no nose, a wide flat seat top, and a pivot, allows both comfortable support of the sit bones and a clear pathway for the leg during the pedal stroke.

In a preferred embodiment of the invention, the pivot axis is located such that it intersects the seat top. This location ensures that the forward motion of one side of the seat (i.e., the starboard side) will correspond to a rearward motion of the other side (i.e., the port side). In a preferred embodiment of the invention the pivot axis intersects the seat top at a location within 50 mm, in the Y direction, of the front edge of the seat top.

FIG. 6 shows the bottom side of an embodiment of the invention. In this embodiment, the pivot is comprised of a round shaft supported by a bushing and a thrust washer, and retained by a snap ring.

FIG. 7 shows how the elements of an embodiment of the invention go together. In addition to a shaft, bushing, and snap ring to form the pivot, a stop pin extends from a pivot block to engage with a slot in the seat top. Two springs on either side of the stop pin rest in the slot so that a spring action restores the seat to the center position after it has been displaced one direction or the other.

FIG. 8 shows schematically an embodiment of the invention from the side. While the pivot axis is substantially vertical, the seat top is angled downward to better match the angle of the bottom side of the rider's leg. In a preferred embodiment, the angle ranges from essentially horizontal to a downward angle of approximately 30 degrees.

FIG. 9 shows the same bottom view of the pelvic area as FIG. 3, but in this instance an outline of a preferred embodiment of the invention is superimposed. The width of this embodiment extends well beyond the width of the sit bones and no protruding nose extends into the area of the pudendal canal.

FIG. 10 is a side view of the human pelvic anatomy showing how the pudendal nerves and arteries connect from the interior region of the pelvis to the exterior. The area where the pudendal canal passes under the pubic arch is exactly one of the areas where a conventional saddle can support the pelvis. The present invention supports the rider's weight well rearward of the pudendal canal.

The foregoing discussion should be understood as illustrative and should not be considered to be limiting in any sense. While this invention has been particularly shown and described with reference to preferred embodiments thereof, it will be understood by those skilled in the art that various changes in form and details may be made therein without departing from the spirit and scope of the invention.

For instance, in another preferred embodiment of the invention, the seat top may be comprised of two distinct areas, one for each sit bone. These two areas would be rigidly connected, so that the rotation forward of one area would correspond to the rotation rearward of the other. While in the preferred embodiment illustrated in these figures, the pivot axis is exactly vertical, some deviation from vertical can be accommodated without detracting from the intended function.

I claim:

1. A nose-less pivoting bicycle seat comprising a lower seat and an upper seat;
    wherein said lower seat comprises two substantially parallel rail elements for attaching to a bicycle; wherein a fore-aft axis lies substantially equidistant from and parallel to said two rail elements; wherein said two rail elements are attached to said lower seat at only their aft ends;
    wherein said upper seat and said lower seat are connected by a pivot; wherein the axis of rotation of said pivot approximately intersects with and is substantially perpendicular to said fore-aft axis;
    wherein said upper seat further comprises a starboard sit bone support surface and a port sit bone support surface, wherein said starboard sit bone support surface and said port sit bone support surface are oriented to lie substantially within a single plane; wherein said starboard sit bone support surface and said port sit bone support surface are disposed on opposites sides of said fore-aft axis along a starboard-port axis perpendicular to said fore-aft axis and perpendicular to said axis of rotation.

2. The seat of claim 1 wherein said rail elements further comprise removable caps attached at their forward ends, and wherein said removable caps are larger in diameter than said rail elements.

* * * * *